Jan. 9, 1934.  C. DAUM  1,943,113
FOOD SLICER
Filed April 25, 1931  2 Sheets-Sheet 2
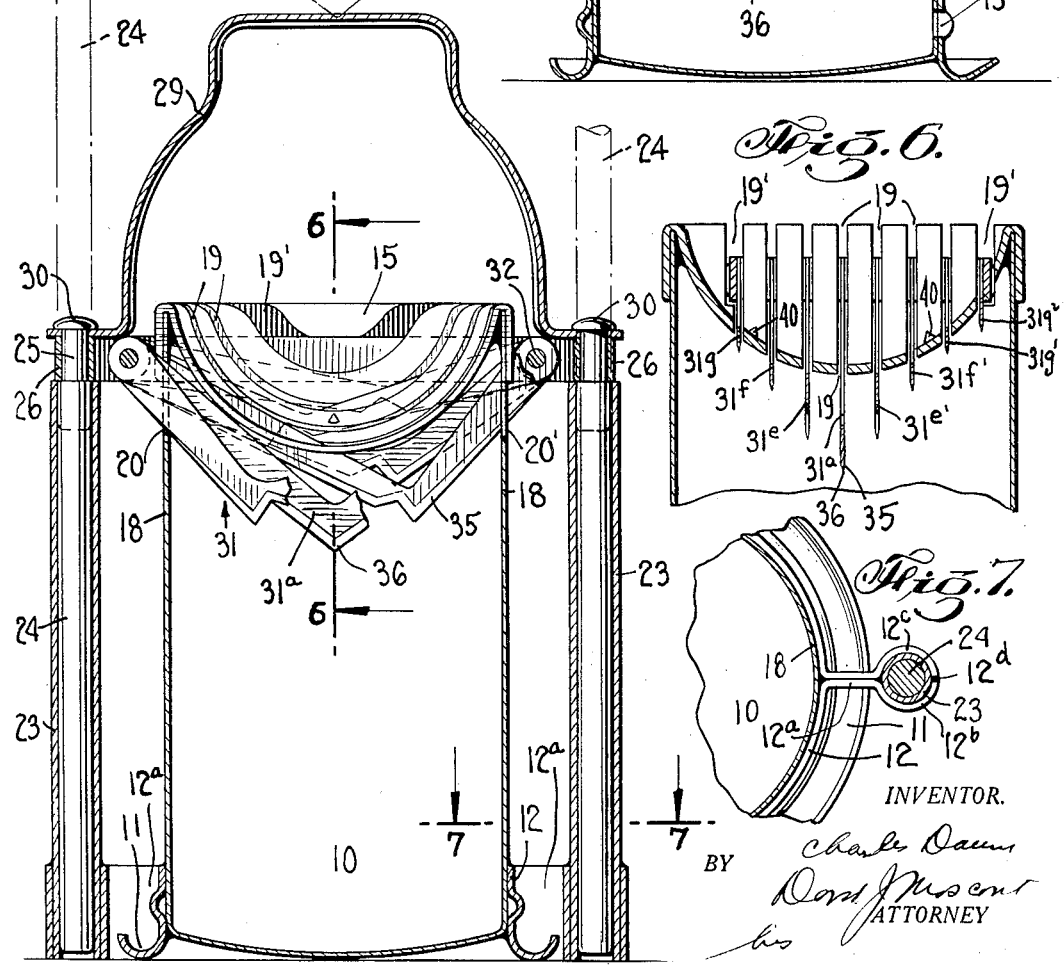
INVENTOR.
Charles Daum
BY
ATTORNEY Patented Jan. 9, 1934

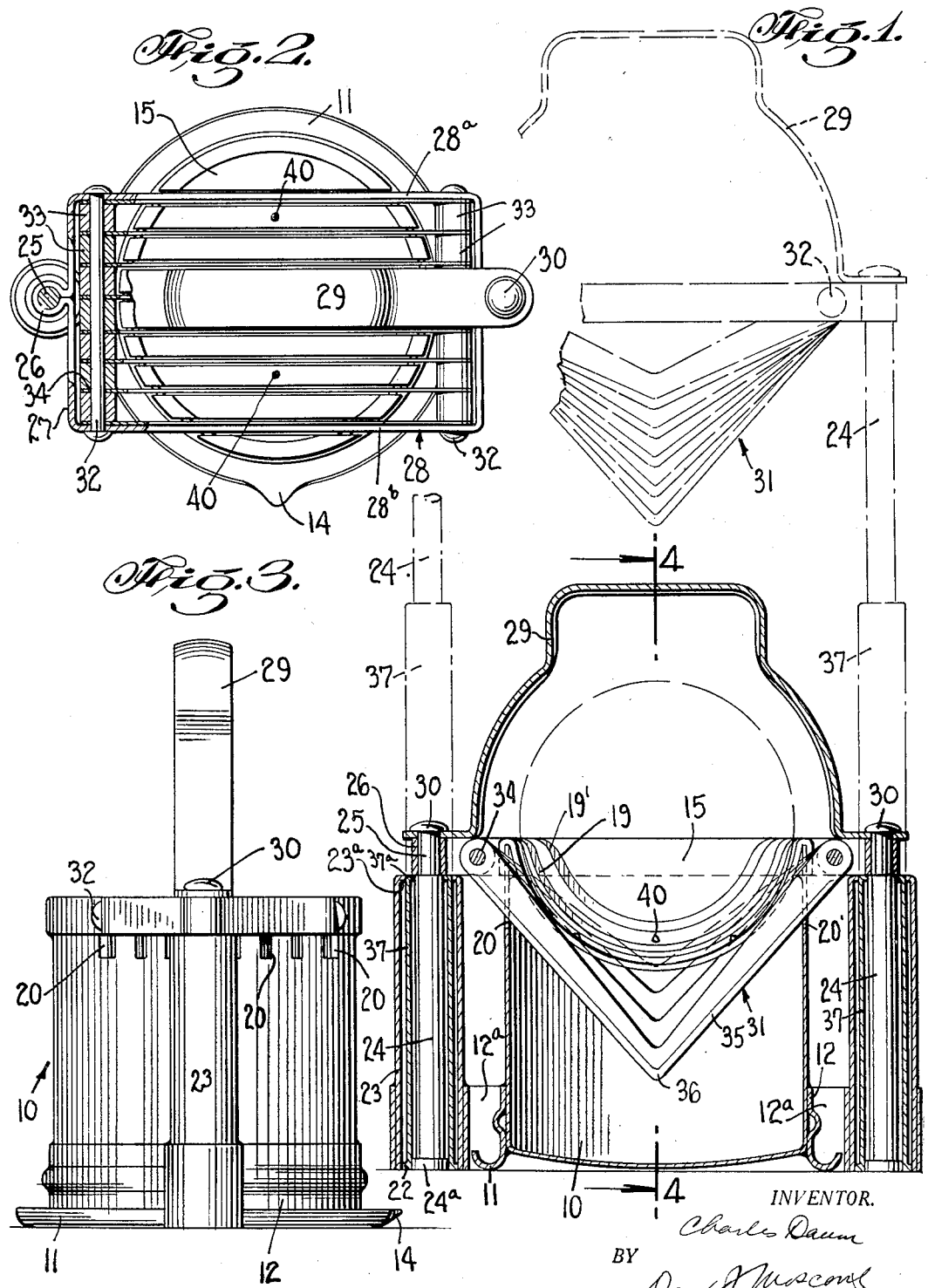

1,943,113

UNITED STATES PATENT OFFICE 1,943,113

FOOD SLICER

Charles Daum, New York, N. Y.

Application April 25, 1931. Serial No. 532,820

2 Claims. (Cl. 146—160)

This invention relates to improvements in food slicers, being particularly directed to a mechanism for use in slicing vegetables, fruits, and other edible products.

Broadly, it is an object of this invention to provide for a slicing mechanism wherein the slicing elements thereof are adapted to first pierce and then cut into several sections the product to be acted upon.

Specifically, it is an object of this invention to provide for a mechanism comprising a support for the product to be cut and a movable series of cutting elements of varying size, disposed in spaced relationship one with respect to the other, the lower-most extremity of each cutting element having a sharp piercing edge, and the said cutting elements respectively being of decreasing size or depth away from the center, the said cutting elements being adapted, upon displacement in one direction, to first pierce and then slice the product carried in the support; the cutting elements and the surface of the support being so formed as to permit the cutting elements to be received within the hollow confines of the support, after the slicing of the product has taken place, and to permit the withdrawal of the sliced product at this time so disposed so as to be positioned on the support but within the confines of the movable elements.

Still further, it is an object of this invention to provide for a novel slicing mechanism for food products, wherein a food product carried on the substantially hemispherical slotted surface of a support is adapted to be acted upon by a series of reciprocating slicing elements having both piercing and cutting edges, the respective slicing elements being of decreasing height and size with respect to the center slicing element, and being so shaped as to permit the removal of the sliced food product from the position on the support, after the slicing operation is complete, and the cutting surfaces of the slicing elements guided within the slotted portion of the support and disposed within the hollow section thereof directly thereunder.

These and other advantages, capabilities and features of the invention will appear from the subjoined detail description of one specific embodiment therefor illustrated in the accompanying drawings, in which Figure 1 is a front elevation, partly in section, of the device in use.

Figure 2 is a plan view of the same.

Figure 3 is a side elevation of the same.

Figure 4 is a side elevation, partly in section, of the same.

Figure 5 is a front view of a modified form of the device.

Figure 6 is a side elevation of the structure shown in Figure 5.

Figure 7 is a plan elevation, partly in section, along the lines 7—7 of Figure 5.

Referring to the reference characters in the drawings, numeral 10 represents a receptacle, here shown as a cylindrical stamped metal element of hollow interior and open top. The receptacle has welded or riveted to the lower peripheral portion of the side thereof, a supporting flange or band, which flange or band is formed of a strip of metal blanked out to form a body portion 11, and laterally disposed supporting legs 12; the said legs 12 extending substantially one-half way about the periphery of the receptacle and terminating at a point adjacent the necks 12a of the loops 12b and 12c disposed so as to be at opposite sides of the receptacle, in which loops there are adapted to be disposed and rigidly fixed the guide tube supports 22. As shown in Figures 1, 3, 5 and 7, the body portion 11 may be in the form of a unitary strip or, in a more practical form, may comprise of a flat strip of metal in association with the legs 12 which is welded or riveted at its free ends, as at 12d, adjacent the guide tube supports (see Figure 7).

At a point along the periphery of the band or flange 11, and at the side of the receptacle, there is provided an aperture 13 through which any of the fluid caused to be discharged or disposed in the receptacle by operation of the cutting elements, to be later described, may be discharged, the lateral portion of the band or flange, that is, the portion of the leg 12 adjacent the aperture 13, is bent outwardly to provide for a spout 14 (see Figures 2 and 4).

Upon the open top of the receptacle there is adapted to be disposed a hollowed semi-hemispherical carrier cup 15, which cup has a depending flange 16 about its peripheral surface to form a channel 17. The upper extremity of the side wall 18 of the receptacle is adapted to be disposed in the channel 17 of the carrier cup, the carrier cup being adapted either to be permanently fixed to the receptacle or being adapted, as in the form shown herein, to be separably interlocked with the receptacle.

As shown in Figures 1, 2 and 4 to 6, the carrier cup has formed therein a series of slots 19 extending across the same and the channel 16 thereof, and disposed substantially equidistant one with respect to the other and in parallelism, the slots 19' and 19" furthest from the center of the carrier cup being of greater width than the remaining slots, for a purpose to be later described. The side wall 18 of the receptacle has formed therein slots 20 and 20' corresponding to and formed in continuation of the slots in the carrier cup, the slots of the carrier cup, as shown in Figures 1 and 5 being adapted to extend completely across the peripheral surface of the carrier cup. As is indicated in Figures 1, 3 and 5, the slots 20 formed on the side walls of the receptacle are of gradually increasing depth towards the center slots and diametrically opposed one to the other, the respective slots 20 being of different depth for the purpose of accommodating the edges of the respective cutting elements which, as shown in the drawings, increase in size and depth towards the center.

Within the guide tubes 23 there are adapted to be disposed the guide rods 24, which guide rods may be hollow or formed of solid metal and have a restricted neck portion 25, about which there is adapted to be disposed the loops 26 forming part of the exterior wall structure 27 of the cutting blade carrying element 28, there being likewise adapted to be disposed in the restricted neck portion, the end extremities of the handle portion 29, the upper extremity of the guide rod being headed as at 30, to retain the loops 26 of the blade carrying element 28 and the ends of the handle 29. The blades 31, which are of different size and shape, as will be later described, are spaced equidistant one from the other in the blade carrying element, by means of a plurality of locking bolts 32, passing through spacing washers 33 and the apertures 34 at opposite ends of the blades, the locking bolts being headed at opposite extremities so as to provide for the fixed positioning of the respective blades one with respect to another.

As shown in Figure 1, the blades 31 in the modification therein disclosed are substantially in the form of V notches sharpened at their lower surface, and shaped as at 35 to form piercing points as at 36, the said blades being formed one with respect to another as to provide for one blade 31a disposed substantially centrally with respect to the remaining other blades, which blade is of greater size and greater depth than the others. The remaining blades are divided in pairs substantially as 31b and 31b'; 31c and 31c'; 31d and 31d', and 31d2.

As shown in Figures 4 and 6, and as previously described, cutting knives 31d2 and 31g2 are shown as to be disposed for reciprocation in slots 19' at a point further away from the center cutting blade 31a than the blade 31d and 31d' respectively and 31g and 31g' respectively, the purpose of the application of this extra blade being to eliminate too much waste in the resultant sliced fruit, particularly a tomato, since usually either the top or bottom of such fruit has a surface which is not normally of pleasant appearance or of edible properties.

However, such portion, be it at the top or the bottom of such fruit is not of great depth and therefore, the use of a knife blade which will cut the same at a point in close proximity to such top or bottom surface will provide for both a more appetizing appearance and economical slicing of the fruit.

As shown in Figures 5 and 6, the blades 31 are of substantially different formation one with respect to the other, although blade 31a, which is the one of greatest size and depth and substantially centrally disposed with respect to the carrying element, is of V shape, having its piercing point similar to that blade shown in Figure 1. The remaining blades disposed in pairs and of progressively decreasing size towards the opposite sides of the blade carrying element are substantially W shaped, elements 31e and 31e'; 31f and 31f'; 31g and 31g' and 31g2, being disposed so as to bring about a progressively varying disposition of the piercing points of the respective blades, it being observed that in the modification herein described, the piercing points of all the blades are at points distant from the piercing point of blade 31a.

As shown in the modifications disclosed, the side portions 28a and 28b of the blade carrying element are adapted to be disposed within the slots 19' and 20' formed in the carrying cup and the side walls, so that the complete blade carrying element and the blades, when the device is depressed in the full line positions, shown in Figures 1 and 5, such blade carrying element and the blades will be disposed completely within the hollow confines of the receptacle 10, so as to permit the food product, which for the purpose specified, may be a tomato, to be removed in sliced condition from the carrying cup 15 before the blade carrying element is returned to the operating position prior to slicing, shown in the dotted lines in Figures 1 and 5.

In the form shown in Figures 1 to 4 inclusive, the guide rod 24 is adapted to have cooperating with it a telescoping tube 37, the said guide rod having a projection 24a at the base thereof, contacting with the inwardly disposed projection 37a of the upper portion of said telescoping tube, so that when the handle carrying the blade elements is lifted to about half way of its upward path of movement the projection 24a of the guide rod will contact with the projection 37a of the telescoping tube, causing the guide tube to be lifted within the guide tube 23 until the projection 23a on such guide tube contacts with the inward projection of said guide tube support 22; in this manner providing for a telescopic support for the blade carrying element 28.

As shown in Figure 5, the guide rod has no telescopic support associated therewith and may be removed from the guide tube support so as to permit the separation and cleaning of the respective receptacle and knife carrying element, if desired.

In operation, particularly with food products such as tomatoes, and oranges, where the most difficult element in the slicing of the same involves the penetration of the outer surface, the cutting blades of the form disclosed in this invention find particular efficacy in that, as the blades are depressed towards the article to be sliced, for example, a tomato, which is disposed in the carrying cup 15, when the blades are in the position of the dotted lines shown in Figures 1 and 5; first, the piercing point 36 of the cutting blade 31a penetrates substantially the center-most portion of the tomato and, once penetration has commenced, the cutting edges 35 adjacent the piercing points cause the tomato to be sliced at the point of contact of such cutting blade. The remaining cutting blades, as they come into contact with the tomato first pierce the tomato at their original point of contact and then the surfaces of the blades adjacent the piercing points cut the tomato.

Once all the blades have pierced the tomato and the cutting edges act thereon, the blade carrying element controlled by the handle is urged further in its downward movement, until the blades and the side walls 28a and 28b of the blade carrying element are substantially disposed within the interior of the receptacle, the said blades and the end walls as they are depressed being guided within the apertures 19 and 20 formed in the carrying cup 15 and the side walls 18 of the receptacle. Any juices or fluids which are separated from the product in the slicing operation will drip into the receptacle, from whence they may be discharged by tipping the receptacle to cause such fluids to pass through aperture 13 and spout 14.

As shown in Figures 1, 2, 4, 5 and 6, there are formed upstanding from the surface of the hemispherical cup carrier 15 a plurality of projections which are stamped out from such surface; the purpose of such projections being to grip and positively position the food product for the slicing operation.

Although the disclosure herein shows such projections as upstanding stamped points, it is within the province of this invention to substitute therefor a series of separable attachable points or projections which may be placed on the upper surface of the hemispherical carrier 15.

It is obvious that various changes and modifications may be made to the details of construction without departing from the general spirit of the invention as set forth in the appended claims.

I claim:

1. A slicer for food products comprising a hollow base, the upper surface of which is shaped substantially to conform to the lower half of a food product, the said surface having a series of parallel slots formed therealong, and a slicing mechanism for such food product comprising a series of cutting elements of different size and depth, and having piercing points at the lowermost point of each of the same, and means for causing said slicing member to act on the food products carried on said base, the cutting elements being adapted to pass through the slotted portion and enter into the hollow of the base portion, guide members disposed on said base, and means reciprocable in said guide members and carrying said cutting elements for displacement with respect to the base.

2. A slicer for food products comprising a hollow base, the upper surface of which is shaped substantially to conform to the lower half of a food product, the said surface having a series of parallel slots formed therealong, and a slicing mechanism for such food product comprising a series of cutting elements of different size and depth, and having piercing points at the lowermost point of each of the same, and means for causing said slicing member to act on the food products carried on said base, the cutting elements being adapted to pass through the slotted portion and enter into the hollow of the base portion, guide members disposed on said base, and means reciprocable in said guide members and carrying said cutting elements for displacement with respect to the base, said cutting elements being disposed with respect to the carrier therefor as to permit removal of the sliced food product from the carrier, when the blades of the slicing elements are disposed within the hollow of the base.

CHARLES DAUM.